US012440520B2

(12) United States Patent
Yang et al.

(10) Patent No.: US 12,440,520 B2
(45) Date of Patent: Oct. 14, 2025

(54) SOFT CAPSULE CONTAINING TYNDALIZED BACTERIA IN FILM

(71) Applicant: PHIL INTERNATIONAL CO., LTD., Seoul (KR)

(72) Inventors: Seung Woo Yang, Seoul (KR); Jin Kyo Lee, Gyeonggi-do (KR); Hyung Soo Shin, Gyeonggi-do (KR); Dong Hyun Yoo, Seoul (KR); Jung A Kim, Incheon (KR); Eun Bora Kim, Busan (KR)

(73) Assignee: PHIL INTERNATIONAL CO., LTD., Seoul (KR)

(*) Notice: Subject to any disclaimer, the term of this patent is extended or adjusted under 35 U.S.C. 154(b) by 646 days.

(21) Appl. No.: 17/636,158

(22) PCT Filed: May 4, 2020

(86) PCT No.: PCT/KR2020/005920
§ 371 (c)(1),
(2) Date: Feb. 17, 2022

(87) PCT Pub. No.: WO2021/033871
PCT Pub. Date: Feb. 25, 2021

(65) Prior Publication Data
US 2022/0288139 A1    Sep. 15, 2022

(30) Foreign Application Priority Data

Aug. 20, 2019  (KR) .................. 10-2019-0101684
Apr. 22, 2020  (KR) .................. 10-2020-0048844

(51) Int. Cl.
*A61K 35/747* (2015.01)
*A61K 9/48* (2006.01)
*A61K 35/744* (2015.01)
*A61K 35/745* (2015.01)

(52) U.S. Cl.
CPC .......... *A61K 35/747* (2013.01); *A61K 9/4825* (2013.01); *A61K 9/4875* (2013.01); *A61K 35/744* (2013.01); *A61K 35/745* (2013.01)

(58) Field of Classification Search
CPC ... A61K 35/747; A61K 9/4825; A61K 35/744
See application file for complete search history.

(56) References Cited

U.S. PATENT DOCUMENTS 8,173,160 B2 *  5/2012  Schramm ............... A23D 7/005
                                                 426/601

FOREIGN PATENT DOCUMENTS

| CN | 107714672 B | * | 8/2019 | .......... A61K 35/747 |
|----|-------------|---|--------|----------------------|
| JP | 11-199494 A |   | 7/1999 |                      |
| KR | 10-1991-0000655 B1 | | 1/1991 |              |
| KR | 10-2011-0046020 A | | 5/2011 |               |
| KR | 10-1166798 B1 | | 7/2012 |                   |
| KR | 10-1790666 B1 | | 10/2017 |                  |

OTHER PUBLICATIONS de Simone, Claudio; "The Unregulated Probiotic Market"; Apr. 2019; Clinical Gastroenterology and Hepatology; vol. 17 Iss. 5 pp. 809-817 (Year: 2019).*
CN-107714672-B (Google English translation, downloaded Aug. 2024) (Year: 2024).*
Pique et al., Health Benefits of Heat-Killed (Tyndallized) Probiotics: An Overview, Int. J. Mol. Sci. 2019, 20, 2534; doi:10.3390/ijms20102534 (Year: 2019).*
International Search Report from corresponding PCT Application No. PCT/KR2020/005920, dated Aug. 26, 2020.

* cited by examiner

*Primary Examiner* — Robert A Wax
(74) *Attorney, Agent, or Firm* — Harness, Dickey & Pierce, P.L.C.

(57) ABSTRACT

The present invention relates to a soft capsule comprising tyndalized bacteria in a film. The soft capsule, according to the present invention, can secure homogeneity of the tyndalized bacteria in the film even with a trace amount of the tyndalized bacteria, and since functional ingredients and the tyndalized bacteria can be administered simultaneously, the advantages due to the functional ingredients and the advantages due to the tyndalized bacteria can be obtained simultaneously.

10 Claims, 4 Drawing Sheets

SOFT CAPSULE CONTAINING TYNDALIZED BACTERIA IN FILM

CROSS-REFERENCE TO RELATED APPLICATIONS

This application is a national phase application of PCT Application No. PCT/KR2020/005920, filed on May 4, 2020, which claims the benefit and priority to Korean Patent Application Nos. 10-2019-0101684, filed on Aug. 20, 2019 and 10-2020-0048844, filed on Apr. 22, 2020. The entire disclosures of the applications identified in this paragraph are incorporated herein by references.

TECHNICAL FIELD

The present invention relates to a soft capsule.

BACKGROUND ART

Capsules which are formulation products widely used in the pharmaceutical, cosmetic and food fields are comprised of a capsule shell layer formed by molding materials such as gelatin, etc. in a particular shape, and a fill solution which composes a core.

Generally, the fill solution composing the core of the soft capsule includes ingredients with a pharmaceutical activity or functionality, and the pharmaceutically active or functional ingredients which may be included in the fill solution of the soft capsule include a variety of ingredients such as vitamins, herbal medicine extracts, functional oil, etc.

Securing homogeneity of the content in formulation for stability and effectiveness as fundamental requirements that pharmaceutical products and the like should possess is essential in pharmaceutically active ingredients or functional ingredients included in the fill solution composing the core of the soft capsule.

Conventionally, in order for a fill solution of a core capsule to homogeneously include pharmaceutically active ingredients or functional ingredients, homogeneity has been secured by dispersing the ingredients using solubilizing agents or using surfactant-suspending agents in the case of solid contents. However, if there are insoluble ingredients in water and/or an oily material, no proper solubilization conditions can be easily found, and high-fat oils and fats, such as waxes, which are mainly used as surfactant-suspending agents, are used after they are heated at 60° C. or higher and liquefied during formulation, so that there is a problem in stability, such as destruction or denaturation of ingredients vulnerable to heat.

In particular, in the case where a small amount of solid pharmaceutically active ingredients or functional ingredients are added, even if surfactant-suspending agents are used, it is very difficult to homogenize the main ingredient in the formulation, and the main ingredient is separated and deposited over time, thus lowering the homogeneity thereof.

SUMMARY

Technical Problem

The present invention is intended to provide a soft capsule in which dead bacteria are homogeneously comprised even with a small amount.

Solution to Problem

Hereinafter, the above object will be described in detail. All combinations of a variety of compositions described in the present invention pertain to the category of the present invention. Moreover, the category of the present invention is not deemed to be limited by the following detailed explanations.

A soft capsule according to one aspect of the present invention comprises: a core of the soft capsule containing a fill solution; and a capsule shell layer surrounding the core of the soft capsule and comprising dead bacteria.

The term "core of a soft capsule" used in the present invention means an interior part of a capsule surrounded by the capsule shell layer. In accordance with the soft capsule of the present invention, the core of the soft capsule may be 100% filled with a fill solution, or it may be an empty space not filled with the fill solution.

The term "fill solution" used in the present invention may comprise one or more types of ingredients with a pharmaceutical activity or functionality, but is not limited thereto. The fill solution may be a single liquid material with fluidity, and a mixture in which a solid material is dispersed or solubilized in a liquid material constituting a matrix, or a mixture of two or more liquid materials.

The term "capsule shell layer" used in the present invention means a layer surrounding the core of the soft capsule. The main material constituting the capsule shell layer may be a polymer material with viscosity. For example, the polymer material may be an animal material using gelatin and the like or a vegetable material using starch and the like, but is not limited thereto, and in producing soft capsules, sufficient physical properties can be secured to form a capsule shell layer, and any material suitable for a living body can be used as the main material for the capsule shell layer.

According to one embodiment of the present invention, a polymer material forming the capsule shell layer may have high viscosity. For example, the viscosity of the polymer material may be 8,000 to 20,000 cP at 60° C. When the viscosity of the polymer material exceeds 20,000 cP, it may be hard on a stirrer in the process of stirring or it may be difficult to mold the soft capsule, and homogeneous dispersion and mixing of dead bacteria may be difficult due to high viscosity. Furthermore, when the viscosity of the polymer material is less than 8,000 cP, it may be difficult to maintain the shape due to high fluidity, so there may be a problem in molding soft capsules. Therefore, in order to facilitate the process of molding the soft capsules, the viscosity of the polymer material may be in the range of 8,000 to 20,000 cP. Preferably, the viscosity of the polymer material may be 10,000 to 15,000 cP.

Moreover, a high-viscosity polymer material of the capsule shell layer may stably maintain the dead bacteria dispersed in the capsule shell layer, thereby preventing separation and sedimentation of the dead bacteria in the capsule shell layer over time. Thus, homogeneity of the dead bacteria in the capsule shell layer may be ensured until the fill solution is subjected to the process of filling or drying/curing. Accordingly, the present invention may provide a soft capsule in which the dead bacteria are homogeneously comprised in the capsule shell layer.

The term "homogeneous or uniform" used in the present invention means that ingredients or characteristics are constant no matter which part of the soft capsule is taken. In the present invention, the fact that the dead bacteria are homogeneously present in the capsule shell layer means that the dead bacteria are homogenously distributed throughout the capsule shell layer.

Examples of the polymer material may include gelatin, denatured starch, pectin and shellac. According to one example of the present invention, the polymer material of the capsule shell layer may comprise gelatin.

In the present invention, the term "gelatin" may be gelatin or succinylated gelatin prepared using pigskin or cowskin, but is not limited thereto, and all gelatins available in producing pharmaceutical products or food are included in the scope of the present disclosure.

A composition (mass) for forming a capsule shell layer using gelatin as the main material has a high viscosity of about 10,000 cP or more at 50° C., and decreases in viscosity as the temperature increases. Using this property, when preparing and conveying the composition for forming the capsule shell layer using gelatin as the main material, the composition is controlled such that it has relatively low viscosity at about 60 to 90° C., and when the capsule shell layer is molded, the composition is cooled at about 15 to 30° C. to increase its viscosity, thereby enabling good bonding in the molding process.

Since such gelatin has high viscosity at a low temperature of 50° C. or less, when gelatin is used as a main material for the capsule shell layer, the dead bacteria are not easily separated from the capsule shell layer, so that the homogeneity of the dead bacteria can be ensured for a long time.

The soft capsule of the present invention may comprise other additives within a range that does not damage description stability, the rate of collapse and the homogeneity of the dead bacteria of the soft capsule. For example, in preparing the capsule shell layer, it may be prepared by adding a plasticizer such as glycerin and sorbitol solution, and/or purified water, to the main material.

The term "plasticizer" used in the present invention refers to a material applied to facilitate molding processing of the capsule shell layer at a high temperature and control elastic strength. For example, the plasticizer may be glycerin, sorbitol, maltitol, mannitol, lactitol, palatinate, xylitol, erythritol, isomalto-oligosaccharides, propylene glycol, polyethylene glycol, polyalkylene glycol, diethylene glycol, 1,2-propylene glycol, glycerol monoacetate, glycerol diacetate, glycerol triacetate, sugar alcohol, monosaccharides, disaccharides, oligosaccharides, isomalto-oligosaccharides, inert sugars and corn syrup alone, or a mixture of any two or more thereof, but according to the present invention, plasticizers may be comprised without limitation if they are available in producing medicines or food, as long as they do not damage the homogeneity of dead bacteria included in the capsule shell layer.

The soft capsule of the present invention may further comprise colorants. Typically, colorants include organic or inorganic pigments, or colorants approved for cosmetic use by the CTFA and the FDA, such as conventional pigments used in rakes, iron oxide, iron sulfide or other cosmetic formulations, and may use one or more types of the colorants, but are not limited thereto.

The term "dead bacteria" used in the present invention refers to a killed or inactivated bacterium, and includes a plurality of bacteria. The death or inactivation of bacteria may be performed by various methods, such as heat treatment after culturing live bacteria or the like under certain conditions. In the present invention, the dead bacteria may include ones prepared by separating and extracting effective ingredients from dead bacteria. Tyndallization is a typical method of sterilizing live bacteria, and according to the present invention, the dead bacteria comprised in the capsule shell layer can be used by sterilizing live bacteria or can be used by purchasing commercialized dead bacteria.

Bacteria are insoluble in water and oils, and do not have many suitable solubilizers due to their nature, and specifically, since live bacteria are unstable in heat, any problem in stability may occur due to the presence of a high-temperature process in producing the capsule shell layer of the soft capsule. However, according to the present invention, the dead bacteria comprised in the capsule shell layer of the soft capsule are stabilized in heat, and thus, even if they are comprised simultaneously with raw materials such as gelatin, etc., in producing the capsule shell layer and undergo a high-temperature process during production, it is possible to secure the stability of the dead bacteria.

In other words, according to the present invention, the capsule shell layer of the capsule comprises dead bacteria which are one of pharmaceutically active ingredients or functional ingredients, by which homogeneity and stability of the dead bacteria may be ensured under high-temperature processes. In addition, it is possible to prevent the separation or sedimentation of the dead bacteria in the capsule shell layer as time passes, and a variety of functional ingredients that may be comprised in the fill solution can be administered simultaneously with the dead bacteria without their denaturation or destruction.

According to one aspect of the present invention, the dead bacteria may be dead lactic acid bacteria.

The term "lactic acid bacteria" used in the present invention refers to bacteria that play a beneficial role in the human body as a kind of probiotic. The lactic acid bacteria are bacteria that produce lactic acid by fermenting sugars such as carbohydrates. About 400 species of lactic acid bacteria have been found so far, and they are known to have physiological activity of enhancing immunity—specifically, gastrointestinal immunity.

In general, conventional *lactobacillus* products use live bacteria, but as heat-treated dead bacteria of *L. rhamnosus* GG, which are representative lactic acid bacteria, are effective in preventing atopic dermatitis, dead bacteria also have been reported to play a role as immunomodulators.

Therefore, the soft capsule of the present invention in which the dead bacteria are comprised in the capsule shell layer, may have the advantage of having functional ingredients comprised in the capsule core, and further provide working effects such as anti-inflammation, infection inhibition, anticancer and immunomodulation by the dead bacteria comprised in the capsule shell layer at the same time.

According to one embodiment of the present invention, the lactic acid bacteria may be one or more selected from the group consisting of *Lactobacillus* sp., *Bifidobacterium* sp., *Streptococcus* sp. and *Enterococcus* sp.

In addition, according to still another embodiment of the present invention, the lactic acid bacteria may be one or more selected from the group consisting of *Lactobacillus casei, Lactobacillus rhamnosus, Lactobacillus plantarum, Lactobacillus acidophilus, Lactobacillus bulgaricus, Lactobacillus salivarius, Lactobacillus reuteri, Bifidobacterium bifidum, Bifidobacterium breve, Bifidobacterium longum, Bifidobacterium animalis, Streptococcus thermophilus, Enterococcus faecium, Enterococcus faecalis, Lactococcus lactis, Lactobacillus paracasei, Lactobacillus helveticus, Lactobacillus gasseri* and *Lactobacillus fermentum*. However, the present invention is not limited thereto, and any lactic acid bacteria having beneficial activity may be included in the scope of the present invention.

According to one aspect of the present invention, the dead bacteria comprised in the capsule shell layer of the soft capsule of the present invention may be 0.001 to 100 mg per 1 g of the capsule shell layer, and the dead bacteria may be homogeneously comprised throughout the capsule shell layer. Preferably, the dead bacteria comprised in the soft capsule of the present invention may be 0.001 to 50 mg per 1 g of the capsule shell layer, more preferably 0.001 to 10 mg per 1 g of the capsule shell layer, even more preferably 0.001 to 1 mg per 1 g and most preferably 0.001 to 0.1 mg per 1 g of the capsule shell layer.

According to another aspect of the present invention, the capsule shell layer of the soft capsule of the present invention may comprise at least $1.0 \times 10^6$ dead bacteria per 1 g of the capsule shell layer, and they are homogeneously distributed throughout the capsule shell layer. The capsule shell layer may comprise, preferably, $1.0 \times 10^7$ to $1.0 \times 10^{11}$ dead bacteria per 1 g of the capsule shell layer, more preferably, $1.0 \times 10^7$ to $1.0 \times 10^{10}$ dead bacteria per 1 g of the capsule shell layer, and even more preferably, $1.0 \times 10^7$ to $1.0 \times 10^9$ dead bacteria per 1 g of the capsule shell layer.

In one embodiment, the dead bacteria of the soft capsule of the present invention may be high-unit dead bacteria including at least $1 \times 10^{10}$/g or more dead bacteria per 1 g and preferably, may be high-unit dead bacteria including $1 \times 10^{11}$/g or more dead bacteria. More preferably, the dead bacteria used in producing the soft capsule of the present invention may be high-unit dead bacteria including $5 \times 10^{10}$/g dead bacteria.

Since the content of the dead bacteria is higher than 10% with respect to 100% of the total weight of the composition in the capsule-formed composition when carrying out capsule molding, a binding force of a bonding part during a molding process may be reduced, so problems such as elution of the contents may occur. Hence, when solids included in the capsule shell layer are 10% or less with respect to the total weight of the composition in the entire capsule shell layer, a stable capsule may be prepared.

The term "small amount" used in the present invention means that the weight of the dead bacteria is 0.1% by weight or less with respect to 100% of the total weight of the capsule shell layer, and may refer to, for example, the amount of the dead bacteria in which 0.001 to 1 mg are present per 1 g of the capsule shell layer.

When the dead bacteria as solid active ingredients are comprised in the fill solution of the core of the soft capsule—for example, 0.1% by weight or less of the dead bacteria are present with respect to 100% of the total weight of the fill solution—it is difficult to homogeneously disperse the active ingredients in the fill solution or maintain the homogeneous dispersion of the active ingredients. However, the soft capsule according to the present invention does not comprise the dead bacteria in the fill solution of the core of the soft capsule, but in the capsule shell layer of the soft capsule, thereby homogenously dispersing the high-unit dead bacteria in the capsule shell layer and maintaining the homogeneity thereof for a long time. That is, the soft capsule in which the dead bacteria are comprised in the capsule shell layer of the present invention can secure and maintain the homogeneity of the dead bacteria in the capsule shell layer even when the soft capsule contains a small amount of dead bacteria, thereby securing both stability of the soft capsule and homogeneity of the dead bacteria.

The term "unit region of the capsule shell layer" used in the present invention may refer to each divided region when the capsule shell layer is divided and classified into the same area, and in the soft capsule of the present invention, no matter which unit region is randomly selected from among the unit regions of a plurality of capsule shell layers, the relative standard deviation (RSD) of the dead cell content for each unit region may be less than 5%. In this case, the unit region may be classified according to the weight of the capsule shell layer. For example, the unit regions may be regions corresponding to 1% by weight with respect to 100% of the weight of the capsule shell layer, and in this case, the relative standard deviation of the content of the dead bacteria included in the unit region may be 0% to less than 5%. Preferably, the relative standard deviation of the content of the dead bacteria for each unit region may be 0% to 3%.

Moreover, since the soft capsule according to the present invention comprises the capsule shell layer with the dead bacteria, it provides excellent homogeneity of the formulation. The homogeneity of the formulation may mean a homogenous content of the dead bacteria between a plurality of soft capsules. For example, the soft capsule of the present invention may have an acceptance value of 15.0 or less in the content homogeneity test of the pharmacopoeial process of KP or USP for confirming the homogeneity of the formulation for the dead bacteria.

Figure 4:
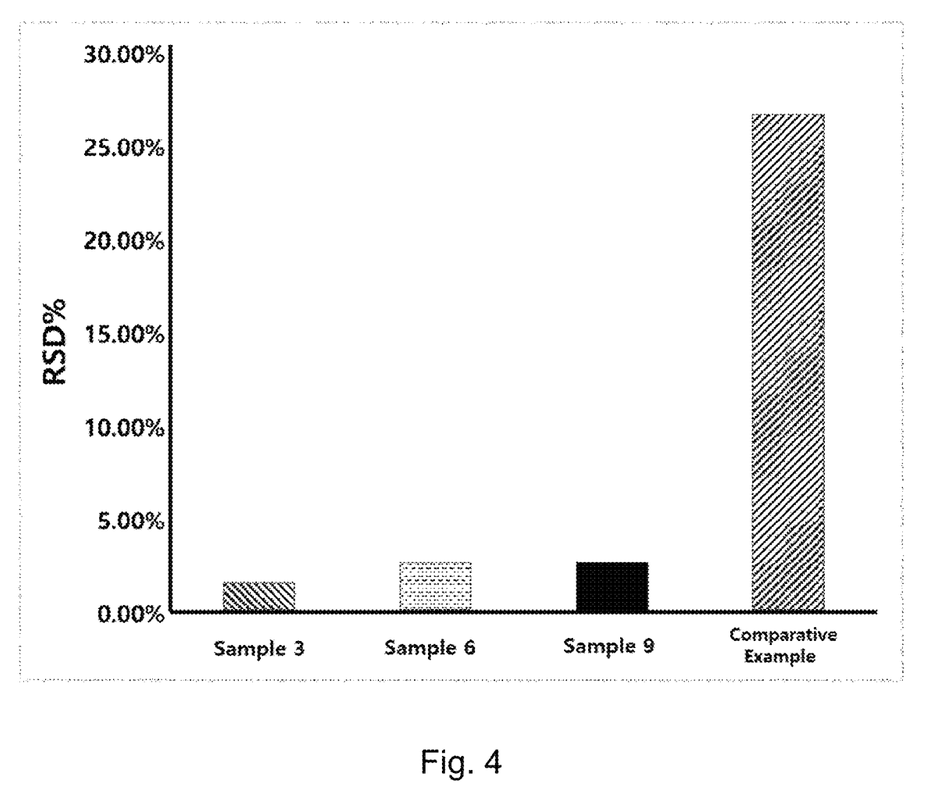
FIG. 4 illustrates a relative standard deviation (RSD) of the homogeneity of dead bacteria of Examples 3, 6 and 9, and the Comparative Example.

The inventors of the present invention have confirmed through experiments that a small amount of high-unit dead bacteria may be homogeneously distributed in the capsule shell layer (see Tables 5 and 6, and FIG. 4).

Moreover, even if dead bacteria of less than 10% with respect to the total weight of the capsule shell layer are added when preparing the capsule shell layer, dead bacteria homogenized through sufficient stirring are not easily separated due to high viscosity from gelatin and the like, thereby securing homogeneity until capsule molding (charging). Therefore, homogeneity in formulation of the soft capsule of the present invention can be secured.

According to one aspect of the present invention, the soft capsule of the present invention may comprise functional oils as a fill solution disposed in a core of the soft capsule. The core of the soft capsule may be filled in whole or in part by functional oils.

According to another aspect of the present invention, functional oils may be present in an amount of about 30% by weight to 100% by weight, preferably 50% by weight to 100% by weight, with respect to the weight of the fill solution of the core of the soft capsule in a state in which the core is completely filled. When the functional oils are not present in an amount of 100% by weight, pharmacologically active ingredients or additives available may be further included together with the functional oils. When the functional oils unstable in heat are included in the fill solution together with the dead bacteria, the stability of the functional oils may be affected by the heat applied in the process of securing the homogeneity of the dead bacteria, which may lead to stability problems of the functional oils. However, in the present invention, the dead bacteria may be comprised in the capsule shell layer to secure the homogeneity of the dead bacteria and simultaneously the fill solution may not be affected by heat, resulting in securing the stability of the functional oils at the same time.

The term "functional oils" used in the present invention refers to oils that affect a certain level when ingested by the human body thanks to certain functions such as improving blood flow, strengthening immunity, reducing body fat and the like.

Examples of the functional oils of the present invention may include EPA and DHA-containing fatty oils, gamma-linolenic acid-containing fatty oils, and the like. EPA and DHA-containing fatty oils, which are representatively recognized for their functionality, are known to be fatty acids included in lipids of blue-backed fish such as sardines and have functionality to help blood flow and eye health, and gamma-linolenic acid-containing fatty oils are an essential fatty acid that is not produced in the human body and can improve skin condition due to immune hypersensitivity reactions. Since such fatty acids are generally easily oxidized via exposure to heat and air, when produced as a soft capsule formulation, the fatty acids do not undergo a heating process in preparation and molding for preventing deformation caused by heat, and are subjected to a process under a nitrogen stream to block contact with oxygen.

Therefore, if the functional oils are included in the fill solution like the dead bacteria that are difficult to homogenize, there may be a problem in the stability of the functional oils due to the heating process during use of a surfactant-suspending agent for the homogenization of the dead bacteria, but the soft capsule according to the present invention does not have a process of directly applying heat to the functional oils because the dead bacteria are included in the capsule shell layer, thus securing the stability of the functional oils.

Furthermore, since the soft capsule according to the present invention comprises dead bacteria in the capsule shell layer and comprises functional materials such as functional oils in the core of the soft capsule, it can have the advantage of the functional oils when administered to the human body and simultaneously obtain anti-inflammatory, intestinal regulation, infection inhibition, anti-cancer or immunomodulatory effects due to the dead bacteria.

The functional oils that may be comprised in the core of the soft capsule according to the present invention may be oil recognized by the Ministry of Food and Drug Safety as a functional raw material for a health functional food, but is not limited thereto and may include all oils commonly known to have certain functionality.

According to one embodiment of the present invention, the above oils comprise vitamin oil (oil containing vitamin A, oil containing vitamin D, oil containing vitamin E), oil containing gamma-linolenic acid (evening primrose oil, borage oil etc.), lecithin oil containing α-GPC, shark liver oil containing alkoxyglycerol and squalene, oil containing octacosanol, conjugated linoleic acid, lutein oil, saw palmetto oil, oil containing phosphatidylserine, astaxanthin oil, cod liver oil, green lipped mussel oil, salmon oil, tuna oil, krill oil, fish oil containing DHA and EPA, algae oil, harp seal oil, eel oil, flaxseed oil, black currant oil, sea buckthorn oil, safflower seed oil, sunflower seed oil, pumpkin seed oil, garlic oil, pine needle oil, pine nut oil, walnut oil, hemp seed oil, grape seed oil, olive oil, avocado oil, coconut oil, perilla oil, sesame oil, wheat germ oil, rice bran oil and parsley oil. If functional oils requested in household goods, personal care and food etc. can be capsulized, these oils are not limited as above. These oils can be used alone or in a mixture of at least two oils.

Advantageous Effects of the Invention

In the soft capsule of the present invention, the dead bacteria comprised in the capsule shell layer are homogeneously distributed throughout the capsule shell layer, and separation and sedimentation of the dead bacteria over time may be prevented to secure the homogeneity of the dead bacteria for a long time.

Moreover, the soft capsule of the present invention comprises the dead bacteria in the capsule shell layer, and thus, the homogeneity can be secured even with a small amount of high-unit dead bacteria that are difficult to secure homogeneity when comprised in the core of the soft capsule.

In addition, the soft capsule of the present invention does not require a heating process needed for homogeneity of the dead bacteria because the dead bacteria are not comprised in the fill solution, so it is possible to secure the stability of the functional ingredients comprised in the fill solution.

Furthermore, in addition to advantages from the functional ingredients comprised in the fill solution and the functional ingredients due to the dead bacteria homogeneously comprised in the capsule shell layer, the soft capsule of the present invention can obtain working effects such as anti-inflammation, intestinal regulation, infection inhibition, anti-cancer or immunomodulation thanks to the dead bacteria at the same time, and can secure the homogeneity of the formulation in the preparing process.

DETAILED DESCRIPTION

Hereinafter, the present invention will be described in more detail through preparation examples and examples. However, these examples are only illustrative, and the scope of the present invention is not limited thereto. Moreover, the terms not particularly defined in the specification of the present invention should be understood to have the meanings commonly used in the technical field to which the present invention belongs.

In the example of the present invention, *Enterococcus faecalis* EC-12 (Metabolite Korea Co., Ltd.; referred to as EC-12 below), which has $5\times10^{12}$/g dead bacteria, *Bifidobacterium longum* BR-108 (Metabolite Korea Co., Ltd.; referred to as BR-108 below), which has $1\times10^{11}$/g dead bacteria, and *Enterococcus faecalis* EF-2001 (Korean Berm Co., Ltd.; referred to as EF-2001 below), which is a high-unit dead cell containing $7.5\times1\times10^{12}$/g dead bacteria, are used as dead lactic acid bacteria.

Examples 1 to 3: Preparation of Samples 1 to 3

Example 1. Preparation of Sample 1 Containing EC-12

Preparation of a Film Mass

In order to prepare a film mass containing EC-12, a film mass was prepared using the ingredients and contents shown in Table 1 below. Specifically, 6 g of EC-12, 706.3 g of gelatin (pigskin, 200 Bloom), 214.3 g of glycerol and 79.4 g of sorbitol solution were put into a glass container with a pressure-reducing cover, and then about 500 to 600 g of purified water was added and stirred for about 10 minutes.

Then, the cover of the glass container was closed to remove air bubbles and the contents in the glass container were heated in a constant-temperature water bath at 80° C. for 3 hours, resulting in preparing a film mass.

Preparation of Sample 1

The prepared film mass was thinly spread to a thickness of about 1 mm on a flat stainless steel plate and moved to a drying chamber with a temperature of 20 to 25° C. and a relative humidity of 20 to 25% to dry the same for one day.

Then, the dried film mass was cut with scissors to be square in width and length of about 2 cm, respectively, to prepare Sample 1 according to Example 1 including about 6 g of the dead bacteria mg per 1 g of the film.

Example 2. Preparation of Sample 2 with BR-108

The film mass was prepared using the ingredients and contents shown in Table 1 below, and Sample 2 according to Example 2 including about 30 mg of the dead bacteria per 1 g was prepared in substantially the same manner as that of preparing Sample 1 in Example 1, except that 30 g of BR-108 were used as dead bacteria.

Example 3. Preparation of Sample 3 with EF-2001

The film mass was prepared using the ingredients and contents shown in Table 1 below, and Sample 3 according to Example 3 including about 4 mg of the dead bacteria per 1 g was prepared in substantially the same manner as that of preparing Sample 1 in Example 1, except that 4 g of EF-2001 were used as dead bacteria.

TABLE 1

|  | Sample 1 | Sample 2 | Sample 3 |
| --- | --- | --- | --- |
| Dead bacteria | 6 g (EC-12) | 30 g (BR-108) | 4 g (EF-2001) |
| Gelatin | 706.3 g | 706.3 g | 706.3 g |
| Glycerol | 214.3 g | 214.3 g | 214.3 g |
| Sorbitol solution | 79.4 g | 79.4 g | 79.4 g |
| Purified water | Q.S | Q.S | Q.S |
| Total | 1006 g | 1030 g | 1004 g |

Examples 4 to 6: Preparation of Samples 4 to 6

Each of Samples 4, 5 and 6 was prepared in substantially the same manner as that of preparing Sample 1 in Example 1 according to the ingredients and contents shown in Table 2 below.

TABLE 2

|  | Sample 4 | Sample 5 | Sample 6 |
| --- | --- | --- | --- |
| Dead bacteria | 6 g (EC-12) | 30 g (BR-108) | 0.4 g (EF-2001) |
| Gelatin | 706.3 g | 706.3 g | 706.3 g |
| Glycerol | 214.3 g | 214.3 g | 214.3 g |
| Sorbitol solution | 79.4 g | 79.4 g | 79.4 g |
| Purified water | Q.S | Q.S | Q.S |
| Total | 1003 g | 1015 g | 1000.4 g |

Examples 7 to 9: Preparation of Samples 7 to 9

Each of Samples 7, 8 and 9 was prepared in substantially the same manner as that of preparing Sample 1 in Example 1 according to the ingredients and contents shown in Table 3 below.

TABLE 3

|  | Sample 7 | Sample 8 | Sample 9 |
| --- | --- | --- | --- |
| Dead bacteria | 0.6 g (EC-12) | 3 g (BR-108) | 0.04 g (EF-2001) |
| Gelatin | 706.3 g | 706.3 g | 706.3 g |
| Glycerol | 214.3 g | 214.3 g | 214.3 g |
| Sorbitol solution | 79.4 g | 79.4 g | 79.4 g |
| Purified water | Q.S | Q.S | Q.S |
| Total | 1000.6 g | 1003 g | 1000.04 g |

Comparative Example: Preparation of a Sample Containing Dead Bacteria in the Fill Solution In order to prepare the fill solution containing the dead bacteria, the fill solution was prepared using the ingredients and contents shown in Table 4 below. Specifically, 4 g of EF-2001, 870 g of soybean oil, 70 g of palm oil, 30 g of lecithin and 30 g of white wax were put into a beaker with a capacity of 1 L, and heated and stirred at about 75° C. for 10 minutes to prepare a fill solution containing about 4 mg of the dead bacteria per 1 g of the fill solution.

TABLE 4

| Materials | Comparative Example |
| --- | --- |
| Dead bacteria | 0.04 g (EF-2001) |
| Soybean oil | 870 g |
| Palm oil | 70 g |
| White wax | 30 g |
| Lecithin | 30 g |
| Total | 1000.04 g |

Experimental Example 1: Evaluation of Homogeneity by Measuring Absorbance

In the experimental example, a UV Spectrophotometer was used to evaluate whether the dead bacteria are homogeneously contained in the film.

Specifically, 10 samples were randomly collected among a plurality of samples in Sample 1 prepared according to Example 1 above, and 5 g of the collected dry film and 5 g of purified water were heated, melted and mixed at about 70° C. to prepare a test sample, and absorbance was measured at a wavelength of 660 nm using a UV spectrometer. A blank test solution was prepared in the same manner as that of preparing the test sample using a dry film containing no dead bacteria. As a homogeneity indicator item, the relative standard development (RSD) and an acceptance value (AV) under the uniformity of dosage units of USP for 10 samples were calculated. For each of Samples 2 to 9 prepared according to Examples 2 to 9, test samples were prepared through the same process as described above to measure absorbance and calculate a determination value.

Figure 1:
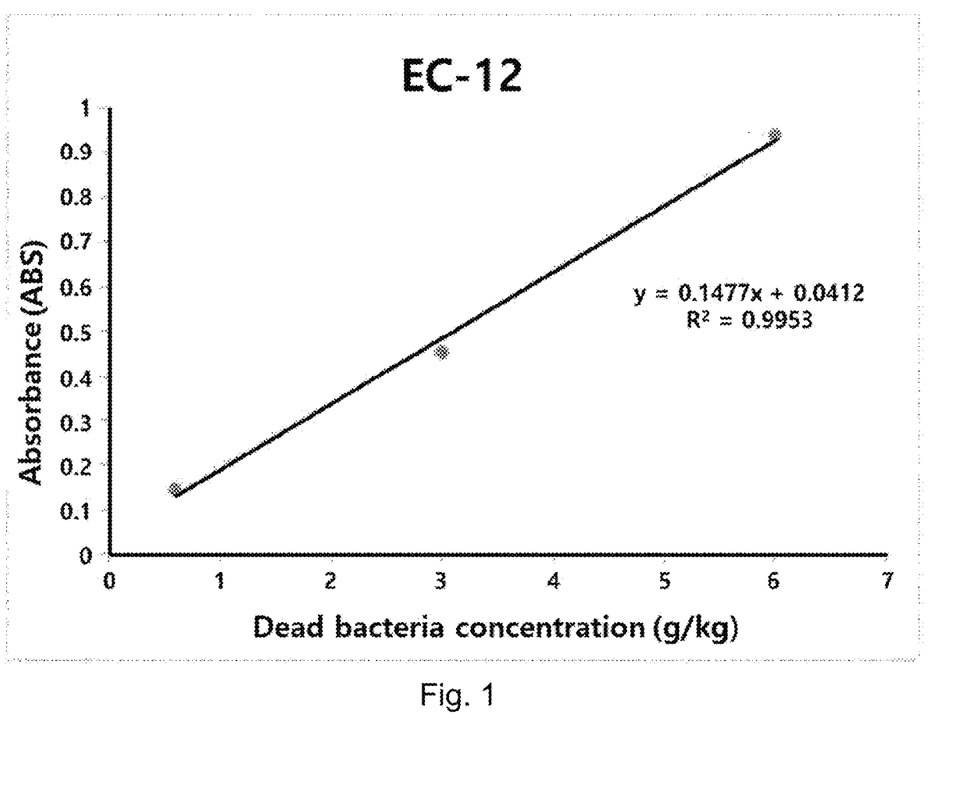
FIG. 1 illustrates a linearity of an absorbance result value according to EC-12 dead cell concentration.
Figure 2:
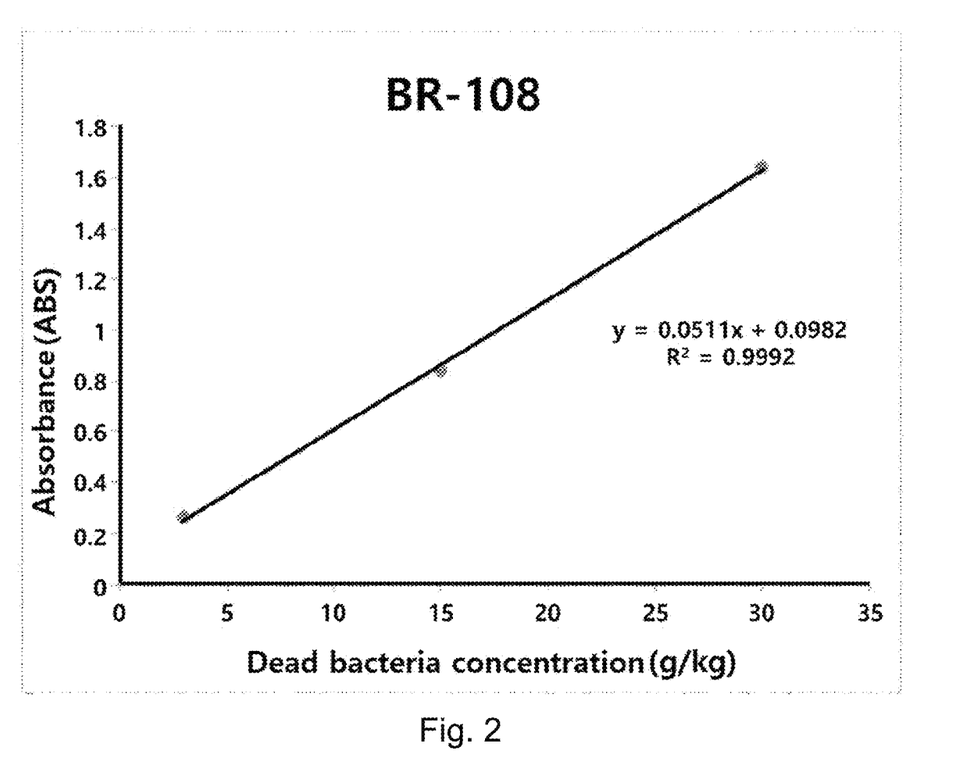
FIG. 2 illustrates a linearity of an absorbance result value according to BR-108 dead cell concentration.

The absorbance measurement results are shown in Table 5 below, and a linearity of the absorbance result values according to the concentration of the dead bacteria is shown in FIGS. 1 and 2.

TABLE 5

|  | Sample 1 | Sample 4 | Sample 7 | Sample 2 | Sample 5 | Sample 8 |
| --- | --- | --- | --- | --- | --- | --- |
| 1 | 0.924 | 0.428 | 0.144 | 1.635 | 0.824 | 0.265 |
| 2 | 0.961 | 0.436 | 0.152 | 1.628 | 0.861 | 0.274 |

TABLE 5-continued

| | Sample 1 | Sample 4 | Sample 7 | Sample 2 | Sample 5 | Sample 8 |
|---|---|---|---|---|---|---|
| 3 | 0.950 | 0.447 | 0.147 | 1.611 | 0.850 | 0.271 |
| 4 | 0.944 | 0.442 | 0.144 | 1.681 | 0.844 | 0.266 |
| 5 | 0.956 | 0.461 | 0.152 | 1.637 | 0.856 | 0.278 |
| 6 | 0.964 | 0.469 | 0.143 | 1.665 | 0.864 | 0.261 |
| 7 | 0.941 | 0.435 | 0.149 | 1.625 | 0.842 | 0.248 |
| 8 | 0.934 | 0.475 | 0.148 | 1.636 | 0.834 | 0.251 |
| 9 | 0.919 | 0.461 | 0.155 | 1.649 | 0.819 | 0.259 |
| 10 | 0.925 | 0.473 | 0.141 | 1.644 | 0.825 | 0.268 |
| Average | 0.9418 | 0.453 | 0.148 | 1.641 | 0.842 | 0.264 |
| RSD (%) | 1.70 | 3.80 | 3.09 | 1.23 | 1.90 | 3.63 |
| AV (%) | 4.09 | 9.12 | 7.41 | 2.95 | 4.57 | 8.70 |

* The determination value was calculated by multiplying a standard deviation value by a determination coefficient (2.4 at n = 10).

As can be seen in Table 5 above, in the case of Samples 1, 4 and 7 (samples including EC-12 dead bacteria), RSD values were about 1.70%, 3.80% and 3.09%, respectively, and in the case of Samples 2, 5 and 8 (samples including BR-108 dead bacteria), RSD values were about 1.23%, 1.90% and 3.63%, respectively. In addition, AV values of each sample have 15 or fewer determination values, which could be confirmed to secure content uniformity. The above results demonstrated that the difference in the number of dead bacteria contained in the film was not large in the randomly selected sample, and thus it could be confirmed that the dead bacteria were homogeneously distributed throughout the film including the dead bacteria prepared in the examples according to the present invention.

Moreover, as can be seen from FIGS. 1 and 2, as the concentrations of each dead cell increased, absorbance also increased, and as a result of calculating a coefficient of determination ($R^2$) through a linear regression analysis by a method of least squares, it could be confirmed that $R^2$ values by each linear formula were 0.9953 and 0.9992 with indication of a good linearity, which provided the close correlation of absorbance according to the concentration of the dead bacteria. This means that a method of measuring the content of the dead bacteria using the UV spectrophotometer is reasonable, and it can be confirmed that RSD values identified in Table 5 can be said to confirm that the dead bacteria are homogeneously distributed throughout the film prepared according to the present invention.

Experimental Example 2: Evaluation of Homogeneity by Measuring the Number of Dead Bacteria In the experimental example, with respect to the measurement of the number of dead bacteria, Real-Time PCR (Polymerase Chain Reaction) was used for accurate measurement.

Ten samples were randomly collected among a plurality of samples prepared according to Examples 3, 6 and 9, and the number of dead bacteria contained per 1 g of the film was measured.

The results of measuring the number of dead bacteria were expressed as commercial log switching values, and the relative standard deviation (RSD) and the acceptance value (AV) under the uniformity of dose units of USP for 10 samples were calculated as homogeneity indicator items.

The results of measuring the number of dead bacteria in Samples 3, 6 and 9 are shown in Table 6 below.

TABLE 6

| | Sample 3 | Sample 6 | Sample 9 |
|---|---|---|---|
| 1 | 10.214 | 9.602 | 8.693 |
| 2 | 10.487 | 9.874 | 8.425 |
| 3 | 10.516 | 9.325 | 8.389 |
| 4 | 10.347 | 9.661 | 8.214 |
| 5 | 10.697 | 9.547 | 8.887 |
| 6 | 10.344 | 9.424 | 8.932 |
| 7 | 10.195 | 9.235 | 8.479 |
| 8 | 10.288 | 9.825 | 8.556 |
| 9 | 10.549 | 9.962 | 8.632 |
| 10 | 10.399 | 9.522 | 8.543 |
| Average | 10.404 | 9.598 | 8.575 |
| RSD (%) | 1.62 | 2.61 | 2.73 |
| AV (%) | 3.88 | 6.27 | 6.56 |

Figure 3:
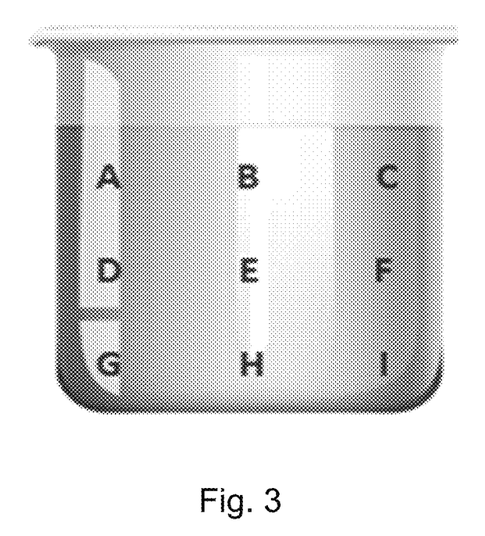
FIG. 3 illustrates an extraction position for evaluating homogeneity of dead bacteria of a sample prepared in the Comparative Example.

Moreover, immediately after preparing the fill solution prepared in the Comparative Example above, samples were collected from 9 points in the fill solution, as shown in FIG. 3, to measure the number of dead bacteria contained per 1 g of the fill solution.

The results of measuring the number of dead bacteria were expressed as commercial log conversion values, and the relative standard deviation (RSD) and the acceptance value (AV) under the uniformity of dose units of USP for 10 samples were calculated as homogeneity indicator items.

The results of the measurement of the number of dead bacteria in the Comparative Example are shown in Table 7 below, and the graph of the RSD values of the Comparative Example is shown in FIG. 4 along with the RSD values of Samples 3, 6 and 9.

TABLE 7

| Sample | Comparative Example |
|---|---|
| A | 9.897 |
| B | 9.315 |
| C | 4.880 |
| D | 5.119 |
| E | 8.326 |
| F | 8.424 |
| G | 10.447 |
| H | 8.833 |
| I | 11.665 |
| Average | 8.545 |
| RSD (%) | 26.52 |
| Acceptance value (AV) | 63.55 |

As can be seen in Tables 6 and 7, and FIG. 4, in the case of Samples 3, 6 and 9, it could be confirmed that the RSD values were about 1.62%, 2.61% and 2.73%, respectively, which indicates that the dead bacteria were homogeneously distributed throughout the film and each sample had high homogeneity compared to the Comparative Example in which the dead bacteria were contained in the fill solution. Specifically, in the case of Sample 9 and the Comparative Example prepared to include 0.04 g of the dead bacteria per 1 g of the capsule shell layer or the fill solution, it can be confirmed that since the RSD of Sample 9 is 2.73% and the RSD of the Comparative Example is 26.52%, Sample 9 is extremely different from the Comparative Example in terms of the RSD, which means that even if the soft capsule in which the dead bacteria are included in the capsule shell layer according to the present invention includes dead bacteria having a relatively low content of 0.04 g per 1 g of the capsule shell layer, it can secure excellent homogeneity. Therefore, it can be confirmed that the soft capsule according to the present invention in which the dead bacteria are included in the capsule shell layer can increase the homogeneity of the dead bacteria in the capsule shell layer.

Furthermore, when the dead bacteria are included in the fill solution, it is greatly significant in that separation and sedimentation of the dead bacteria may occur over time, resulting in reduced homogeneity.

In other words, the present invention may provide the soft capsule that secures homogeneity of the dead bacteria in the capsule shell layer even with a small amount of dead bacteria, and since the soft capsule of the present invention can provide functional ingredients and the dead bacteria at the same time, it may simultaneously offer advantages obtained by functional ingredients and advantages obtained by the dead bacteria. Furthermore, it is possible to secure the homogeneity between the formulations of the soft capsule of the present invention.

What is claimed is:

1. A soft capsule which includes:
   a core of the soft capsule containing a fill solution; and
   a capsule shell layer surrounding the core of the soft capsule and comprising dead bacteria;
   wherein the capsule shell layer comprises the dead bacteria which are homogeneously dispersed throughout the entire area of the capsule shell; and
   wherein the capsule shell layer comprises 0.001 to 100 mg of the dead bacteria per 1 g of the capsule shell layer.

2. The soft capsule according to claim 1, wherein a Relative Standard Deviation (RSD) for the count of dead bacteria contained per 1 g of the capsule shell layer is 0 to 5%.

3. The soft capsule according to claim 1, wherein the capsule shell layer comprises 0.001 to 0.1 mg of the dead bacteria per 1 g of the capsule shell layer.

4. The soft capsule according to claim 1, wherein the capsule shell layer comprises gelatin.

5. The soft capsule according to claim 1, wherein the dead bacteria are dead lactic acid bacteria.

6. The soft capsule according to claim 5, wherein the lactic acid bacteria is one or more selected from the group consisting of *Lactobacillus* sp., *Bifidobacterium* sp., *Streptococcus* sp. and *Enterococcus* sp.

7. The soft capsule according to claim 5, wherein the lactic acid bacteria is one or more selected from the group consisting of *Lactobacillus casei, Lactobacillus rhamnosus, Lactobacillus plantarum, Lactobacillus acidophilus, Lactobacillus bulgaricus, Lactobacillus salivarius, Lactobacillus reuteri, Bifidobacterium bifidum, Bifidobacterium breve, Bifidobacterium longum, Bifidobacterium animalis, Streptococcus thermophilus, Enterococcus faecium, Enterococcus faecalis, Lactococcus lactis, Lactobacillus paracasei, Lactobacillus helveticus, Lactobacillus gasseri* and *Lactobacillus fermentum*.

8. The soft capsule according to claim 1, wherein the fill solution comprises functional oil.

9. The soft capsule according to claim 8, wherein the functional oil is present in an amount of 50 to 100% by weight with respect to the fill solution.

10. The soft capsule according to claim 8, wherein the functional oil is one or more selected from the group consisting of vitamin oil, oil containing gamma-linolenic acid, lecithin oil, shark liver oil, oil containing octacosanol, conjugated linoleic acid, lutein oil, saw palmetto oil, oil containing phosphatidylserine, astaxanthin oil, cod liver oil, green lipped mussel oil, salmon oil, tuna oil, krill oil, fish oil containing DHA and EPA, algae oil, harp seal oil, eel oil, flaxseed oil, black currant oil, sea buckthorn oil, safflower seed oil, sunflower seed oil, pumpkin seed oil, garlic oil, pine needle oil, pine nut oil, walnut oil, hemp seed oil, grape seed oil, olive oil, avocado oil, coconut oil, perilla oil, sesame oil, wheat germ oil, rice bran oil and parsley oil.

\* \* \* \* \*